United States Patent [19]

Giannini et al.

[11] 4,149,990

[45] Apr. 17, 1979

[54] COMPONENTS OF CATALYSTS USEFUL FOR THE POLYMERIZATION OF α-OLEFINS, AND CATALYSTS PREPARED THEREFROM

[75] Inventors: Umberto Giannini, Milan; Enrico Albizzati, Arona (Novara); Sandro Parodi, Oleggio (Novara), all of Italy

[73] Assignees: Montedison S.p.A., Milan, Italy; Mitsui Petrochemical Industries, Ltd., Tokyo, Japan

[21] Appl. No.: 822,547

[22] Filed: Aug. 8, 1977

[30] Foreign Application Priority Data

Aug. 9, 1976 [IT] Italy .................. 26148 A/76

[51] Int. Cl.$^2$ .......................... C08F 4/62; C08F 4/10
[52] U.S. Cl. .................... 252/429 B; 526/125
[58] Field of Search .................... 252/429 B

[56] References Cited

U.S. PATENT DOCUMENTS

| | | | |
|---|---|---|---|
| 3,670,043 | 6/1972 | Kubicek et al. | 252/429 B X |
| 3,676,418 | 7/1972 | Tashiro et al. | 252/429 B X |
| 3,781,220 | 12/1973 | Shilov et al. | 252/429 B |
| 3,859,231 | 1/1975 | Kochhar et al. | 252/429 B X |
| 3,989,881 | 11/1976 | Yamaguchi et al. | 252/429 B X |

*Primary Examiner*—Patrick Garvin

[57] ABSTRACT

There are disclosed new solid catalyst-forming components for use in preparing catalysts for the stereoregular polymerization of alpha-olefins containing at least 3 carbon atoms, mixtures of alpha-olefins with one another and/or with ethylene, said components being obtained by reacting (a) at least one hydrocarbon-soluble halogenated Ti compound;

(b) a product comprising a Mg dihalide obtained by decomposition of an adduct of at least a Mg dihalide and an electron-donor compound present in the adduct in an amount of at least 0.5 mole per mole of Mg dihalide, the decomposition product being characterized in that, in its X-rays powder spectrum, instead of the diffraction line of maximum intensity which appears in the X-rays powder spectrum of the normal Mg dihalide, a halo appears whose intensity maximum is shifted with respect to said line, and (c) an electron-donor compound which does not contain active hydrogen atoms.

The electron-donor compound (c) can be reacted with (a) or combined with (b) before the reaction of (a) and (b).

Methods for preparing the new catalyst-forming components, catalysts obtained therefrom, and use of the catalysts for the production of crystalline homo- and co-polymers of the alpha-olefins are also disclosed.

14 Claims, No Drawings

COMPONENTS OF CATALYSTS USEFUL FOR THE POLYMERIZATION OF α-OLEFINS, AND CATALYSTS PREPARED THEREFROM

THE PRIOR ART

Components of catalysts capable of polymerizing alpha-olefins and prepared by reacting halogen-containing titanium compounds with the product of reaction of silicium compounds or organometallic compounds belonging to Groups I to III of the Mendelyeev Periodic Table with addition products of magnesium halides and electron-donor compounds containing active hydrogen atoms are known, for instance from French Pat. Nos. 2,200,291 and 2,206,339.

When the catalysts obtained from such catalyst components are employed in the polymerization of alpha-olefins, i.e., olefins containing 3 or more carbon atoms, polymers containing considerable amounts of atactic (amorphous) polymer are obtained.

French Pat. Nos. 2,283,909 and 2,300,772 describe catalyst components useful for preparing catalysts for polymerizing alpha-olefins, substantially prepared according to the technique described in the first-cited French patents, with the difference that the reaction between the silicium compound or the compound of the metals belonging to any of Groups I to III of the Mendelyeev Periodic Table, in particular Al, and the addition product of magnesium halide is conducted in the presence of an electron-donor compound. The catalysts resulting from such catalyst components, though having a satisfactory stereospecificity, are not very active and do not permit to avoid, at the conclusion of the polymerization, processes for purifying the polymer from catalyst residues. The activity of such catalysts is rather low, particularly when the polymerization is conducted in the presence of hydrogen as molecular weight modifier and when an Al alkyl partially complexed with an electron-donor compound is used as co-catalyst.

According to the technique described in both of the French Pat. Nos. 2,283,909 and 2,300,772, the preparation of the addition compound of magnesium halide with the electron-donor compounds containing active hydrogen is effected by reacting the electron-donor compound with the magnesium halide suspended in an inert hydrocarbon solvent.

The adduct is then reacted with the Si compound or the Al compound in the presence of an electron-donor compound not containing active hydrogen. The product so obtained is then treated with a liquid halogen-containing Ti compound. The product of the reaction between the Mg halide adduct and the Si compound or the Al compound includes Mg dihalide or essentially consists thereof. On X-rays analysis, it gives a spectrum showing the maximum intensity diffraction lines typical of the Mg dihalide or the maximum intensity line has decreased in intensity thus forming a halo having the intensity maximum shifted with respect to the line itself.

THE PRESENT INVENTION

It has now been found, surprisingly, that, in order to obtain solid catalyst components useful in the preparation of catalysts capable of polymerizing alpha-olefins, i.e., olefins containing at least 3 carbon atoms, and which exhibit satisfactory characteristics as regards both stereospecificity and activity, starting from the product containing Mg dihalide obtained by decomposition of adducts of the Mg dihalide with compounds comprising at least an electron-donor compound, it is necessary that such decomposition product give an X-rays powder spectrum in which at least the maximum intensity line appearing in the normal Mg dihalide powder spectrum is no longer present and in its place a halo appears having its intensity maximum shifted with respect to said line.

Furthermore, it is necessary that the solid catalytic component containing Ti compounds, which comprises the product obtained by reacting the decomposition product with a halogenated Ti compound soluble in hydrocarbons, should not contain Ti compounds soluble in $TiCl_4$ at 80° C. in amounts exceeding 50%, and preferably 20% by weight.

The solid catalyst component of the present invention comprises Mg dihalide and, combined with the dihalide, a Ti compound and an electron-donor compound which does not contain active hydrogen atoms, the molar ratio Mg/Ti in said catalyst component being from 5 to 100 and the g moles of the electron-donor compound being from 0.4 to 3.5 and preferably from 1 to 2 per 1 g atom of Ti, said catalyst component being obtained by reacting:

(a) at least one halogenated Ti compound, soluble in hydrocarbons;

(b) a product comprising a Mg dihalide, obtained by decomposition of an adduct between at least a Mg dihalide and an organic electron-donor compound or ammonia, present in the adduct in a quantity of not less than 0.5 moles per mole of Mg dihalide, the decomposition being carried out with compounds, other than Ti compounds, reactive with the electron-donor compound of the adduct, said decomposition product being characterized in that in its X-rays powder spectrum instead of the maximum intensity line appearing in the Mg dihalide spectrum, a halo appears whose intensity maximum is shifted with respect to said line; and (c) an electron-donor compound which does not contain active hydrogen atoms, which could be also reacted with (a) or combined with (b) before reacting (a) with (b).

In the case of decomposition products of the adducts comprising $MgCl_2$, the X-rays powder spectrum is characterized in that it shows a halo the maximum intensity of which is comprised between 2.44 and 2.97 Å, and in that the line appearing at 2.56 Å in the case of rhombohedral $MgCl_2$ and at 2.75 Å in the case of hexagonal $MgCl_2$ has substantially disappeared. In the case of the decomposition products of the adducts from $MgBr_2$, the halo appears instead of the line at 2.93 Å.

The organic electron-donor compounds suitable for the preparation of the adducts with the Mg dihalide, comprise both compounds containing active hydrogen atoms and compounds which do not contain active hydrogen atoms.

Solid catalyst components that have yielded particularly good results are obtained from decomposition products, with halogen containing compounds of Si or Sn, such as $SiCl_4$ and $SnCl_4$, or with organometallic compounds of Al, such as Al trialkyls, of $MgCl_2$ adducts with aliphatic or aromatic alcohols, phenols, amines or ammonia.

Said catalyst components contain, as compound (c) from 0.4 to 3.5 g. moles/g. atom of Ti, of an ester of an aromatic acid, in particular an alkyl benzoate such as, for example, ethyl benzoate, and an amount of tetravalent Ti compounds insoluble in TiCl4 at 80° C. lower than 4% by weight expressed as Ti metal.

The solid catalyst components are prepared according to various methods. A presently preferred method consists in starting from a Mg halide adduct prepared by dissolving the Mg dihalide in the electron-donor compound and by successively precipitating the adduct either by cooling the solution or by adding an inert liquid that does not dissolve the adduct. The resulting adduct exhibits a homogeneous chemical composition in its whole mass and provides, through chemical decomposition, a product based on Mg dihalide that reveals, on X-rays analysis, a spectrum having the desired characteristics.

The starting Mg dihalide adduct with electron-donor containing active hydrogen can comprise also electron-donor compounds not containing active hydrogen atoms. The amount of such compounds is generally less than 0.5 mole per mole of Mg dihalide. Some examples of such compounds are the alkyl esters of organic acids, in particular the alkyl esters of aromatic acids, and the aliphatic or aromatic ethers.

The adduct may also contain, in a chemically combined form, metal compounds such as, for example, treatment Ti compounds, in particular halogen-containing Ti compounds, Si or Al compounds such as alkyl silicates and Al alcoholates. In fact it is possible to obtain the catalyst components of this invention also starting from adducts of Mg compounds, Ti halides and alcohols prepared according to Belgian Pat. No. 840,058 by dissolving the Mg halide in the alcohol and by adding a tetravalent Ti halide to the solution.

The adduct may also be prepared by grinding, for instance in a vibrating mill containing steel balls, for a time-period of 20–60 hours, a mixture of Mg dihalide with the desired amount or organic electron-donor compound containing active hydrogen atoms. Following this technique it is possible to obtain catalysts provided with a high activity even when the adduct contains a relatively low number of moles, per mole of Mg dihalide, of organic electron-donor compound containing active hydrogen atoms.

The adducts may be prepared in the form of microspheres by spray-cooling or spray-drying according to known techniques. In this case, the polymers prepared in contact with the resulting catalyst have a narrow particles size distribution.

Some examples of electron-donor compounds containing active hydrogen which are useful to prepare the adducts are aliphatic or aromatic alcohols and thioalcohols, phenols, primary and secondary amines, ammonia, amides and aliphatic or aromatic carboxylic acids. Some specific examples of such compounds are the methyl, ethyl, n-butyl and hexyl alcohols, phenol, cresol and ammonia.

The amount of compounds containing active hydrogen generally ranges from 0.5 mole to 6 moles per mole of Mg dihalide. In the case of the adducts with alcohols, best results have been achieved with a number of moles comprised between 2 and 6. The adducts may also contain, in a chemically combined form, water molecules in amounts generally lower than 2 moles per mole of Mg dihalide.

The decomposition of the adducts to products comprising or substantially consisting of Mg dihalide is effected with substances reactive with active hydrogen atoms, different from the Ti compounds. Such substances include, in particular, the organometallic compounds of the metals belonging to any of Groups I to III of the Mendelyeev Periodic Table, compounds of Si, Sn and Sb, and halides of Al and B.

Some typical examples of such substances useful in the practice of this invention are the halogen-containing compounds of Si, Sn and Sb, such as, for example, tetrahalides of Sn or of Si, $SbCl_3$, halides of Si alkyls, halides of Sn alkyls and hydrohalides of Sn, the presently preferred compounds being $SnCl_4$ and $SiCl_4$; other suitable substances are Si tetraalkyls and hydrides of Si alkyls.

Some examples of useful Al organometallic compounds are, among others, Al alkyls, for instance $Al(i-Bu)_3$ and $AlEt_3$, halides of Al alkyls such as $AlR_2Cl$; $AlRCl_2$; $Al_2Et_3Cl_3$; $AlEt_2Br$; $Al(OEt)EtCl$; $Al(OEt)Et_2$ and $Al(i-Bu)_2H$. The presently preferred compounds are Al triisoalkyls such as, for example, Al triisobutyl.

Other useful organometallic compounds are compounds of Mg, Ca or Zn, such as the Grignard reagents, Mg monoalkoxides, Mg dialkyl or Mg diphenyl compounds, Zn monoalkyl or Zn dialkyl compounds.

The amount of reactive substance generally exceeds 1 mole per g-atom of active hydrogen present in the adduct.

The decomposition reaction is conducted in a liquid phase, optionally in the presence of an inert hydrocarbon solvent. When the reactive substance is volatile it can be used in vapor phase.

The electron-donor compounds free from active hydrogen atoms useful for the preparation of the adduct with the Mg dihalides can be any substance capable of forming adducts with the Mg dihalides. Representative compounds are the following:

alkyl-, aryl-, cycloalkyl esters of organic and inorganic acids;

ethers, as for example di-n. butyl ether, diethylether, cyclic ethers as, for example, tetrahydrofuran, dioxane;

ketones such as acetone, benzophenone, cyclohexanone;

anhydrides of carboxylic acids;

aldehydes such as benzaldehyde, anisaldehyde;

nitriles such as acetonitrile, benzonitrile;

trisubstituted phosphines;

azo-compounds;

chlorides of aliphatic acids;

dialkylsubstituted amides;

alkylamides;

tertiary amines and oxides thereof;

substituted lactams;

organic isocyanates; and $POCl_3$, $PSCl_3$.

The adducts with the electron-donor compounds free from active hydrogen atoms contain in general up to 6 moles of said electron-donor.

The decomposition of said adducts is carried out with substances capable of reacting with and at least partially removing the electron-donor compound from the adduct.

Examples of said decomposing substances are the organometallic compounds of Al, Zn, Mg, B, particularly the compounds: $AlR_3$, $AlR_{3-n}X_n$, $MgR_2$, $MgRX$ (Grignard), $ZnRX$, $ZnR_2$, $BR_{3-n}X_n$ wherein; R represents alkyl-, cycloalkyl- or aryl radicals containing 1–20 C atoms, n is less than 3, X is halogen, OR or H. The decomposition conditions are the same as those described above for the decomposition adducts with the donors containing active hydrogen atoms.

It is possible that not all the electron-donor compound is removed from the adduct: in this case the electron-donor left on the decomposition product can be used as reactant (c) for the reaction with the halogenated Ti compound.

Ti compounds to be utilized for preparing the catalyst components according to this invention are, for example, the halogen containing compounds of tetravalent Ti, such as TiCl$_4$, TiBr$_4$ and Ti halogen alcoholates.

The reaction with the Ti compound is preferably conducted in an excess of the Ti liquid compound and successively the unreacted compound is separated at a temperature at which, in the reaction product, the amount of Ti compounds extractable with TiCl$_4$ at 80° C. is lower than 50% by weight.

If TiCl$_4$ is employed as reagent and reaction medium, the reaction temperature is generally comprised between 50° C. and the TiCl$_4$ boiling point, in particular between 90° and 135° C. It is also possible to use higher temperatures when the reaction is carried out under pressure. The separation (by filtration, sedimentation, etc.,) of TiCl$_4$ in excess is preferably conducted at temperatures higher than 80° C., ranging, in particular, from 90° to 135° C.

Catalyst components particularly suitable for preparing catalysts having both high activity and high stereospecificity are prepared starting from adducts of MgCl$_2$ with alcohols according to the following modalities:

the MgCl$_2$ adduct is reacted, either simultaneously or consecutively, with the compound of Si or Sn or Sb and with the electron-donor compound, the reaction being carried out in an inert gas atmosphere, at a temperature ranging from room temperature to the boiling point of the mixture and, optionally, in the presence of an inert solvent such as n-heptane;

the resulting solid product is filtered, washed with n-heptane, dried under vacuum and finally reacted with TiCl$_4$ at a temperature comprised between 100° and 150° C., preferably at 130° C.; after the unreacted TiCl$_4$ has been removed at a temperature higher than 80° C., the catalyst component is washed with n-heptane and dried under vacuum.

When the decomposition of the adduct is carried out with an organometallic Al compound, in particular with an Al trialkyl, the electron-donor compound not containing active hydrogen should be suitable reacted after the decomposition reaction, in order to prevent possible reactions between the electron-donor compound and the Al alkyl, as such reactions would destroy the electron-donor compound.

The decomposition product obtained from the adducts of Mg dihalides with electron-donor compounds either free from active hydrogen atoms or containing the same, may be combined with the electron-donor compound free from active hydrogen before or during the reaction with the halogenated Ti compound. The electron-donor compound is generally used in an amount of at least 0.1 and less than 0.5 mole per mole of Mg dihalide in the decomposition product.

The catalytic solid component containing a tetravalent Ti compound can be treated with a substance capable of reducing the Ti valence to values lower than 4, before being mixed with an organometallic Al compound to form the polymerization catalyst. For example, the catalytic component may be reacted with an Al alkyl compound and the reduction product so obtained used to form the polymerization catalyst.

The electron-donor compound (c) can be any compound capable of forming addition products with the Ti halogenated compounds. They can be the same as the electron-donors used in the preparation of the adducts with Mg dihalides. Suitable compounds are, for instance, the alkyl, cycloalkyl or aryl esters of organic acids, in particular the esters of aromatic acids such as benzoic acid. Some examples of such esters are ethyl benzoate, ethyl p-methoxybenzoate, methyl p-toluate and ethyl p-butoxybenzoate. Other useful compounds are ethers, such as, for example, di-n.butyl and di-phenyl ether, or ketones such as benzophenone or a diamine such as N,N,N',N'-tetramethylethylendiamine.

The catalysts for polymerizing alpha-olefins according to the present invention comprise the product obtained by mixing the following starting components:

(A) an organometallic Al compound which does not contain halogen atoms directly bound to Al;

(B) an organic electron-donor compound in such amount that from 10% to 95% of compound (A) is combined with (B); and (C) the solid catalyst component containing Ti, as disclosed herein.

The Al/Ti molar ratio in the polymerization catalyst is higher than 10 and more particularly ranges from 20 to 500. In a presently preferred embodiment of the invention, compounds (A) and (B) are mixed before contacting them with component (C). Components (A), (B) and (C) may also be added simultaneously. Alternatively, in a presently less preferred embodiment of the invention, component (A) may be added to component (C) before the reaction with (B).

The electron-donor compound used as component (B) can be any compound capable of reacting with the organometallic Al compound (component A) to form complexes and/or substitution reaction products such as for example those obtained by reaction of an Al trialkyl with an electron-donor compound containing active hydrogen atoms and represented, for instance, by the following reaction:

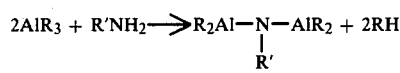

Some examples of electron-donor compounds useful as component (B) are amines, amides, ethers, thioethers, ketones, nitriles, phosphines, stibines, arsines, phosphoramides, aldehydes, esters, thioesters, alcoholates, amides and salts of organic acids and of metals of Groups I to IV of the Mendelyeev Periodic Table. If Al salts are used, they may be prepared in situ by reaction between component (A) and an organic acid.

Preferred electron-donor compounds for use as component (B) are esters of organic and inorganic acids. Particularly suitable are esters of aromatic acids, such as, for example, the alkyl esters of benzoic, p-methoxy benzoic and p-toluic acids. Some examples of such esters are ethyl benzoate, ethyl p-methoxy benzoate, methyl and ethyl p-toluates and ethyl p-butoxy benzoate. Other examples of useful esters are: diethyl carbonate, ethyl pivalate, ethyl acetate, dimethyl maleate and alkyl or aryl silicates, in particular ethyl silicate Si(OC$_2$H$_5$)$_4$.

The organometallic Al compound used as component (A) is preferably an Al trialkyl compound such as, for example, Al triethyl, Al triisobutyl, Al tripropyl,

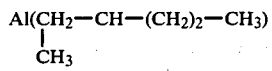

and Al($C_{12}H_{25}$)$_3$.

Also useful are organometallic Al compounds containing two or more Al atoms bound to one another through O-atoms or N-atoms. Some examples of such compounds are ($C_2H_5$)$_2$Al—O—Al—($C_2H_5$)$_2$ and

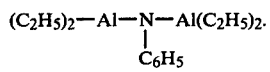

The organometallic Al compounds described in Belgian Pat. No. 842,866 are also useful.

Still other Al compounds which may be used are Al dialkyl hydrides, Al dialkyl alkoxides and Al alkyl sesquialkoxides such as sesquiethoxy Al ethyl and sesquibutoxy Al butyl.

The organometallic Al compounds (A) can also be employed in mixture with an Al alkylmonohalide used in a quantity of less than 1 mole per mole of compound (A).

The electron-donor compound not containing active hydrogen present in component (C) may be the same as or different from the compound not containing active hydrogen employed as component (B). In this embodiment also, any compound capable of forming complexes with the Mg dihalide may be used for preparing component (C). As already mentioned before, the esters are the preferred compounds.

The catalysts according to this invention are preferably employed in the polymerization of the alpha-olefins, containing at least three carbon atoms or of mixtures i.e., alpha olefins with each other and/or with ethylene. They are particularly useful in the preparation of crystalline homo- and co-polymers of propylene.

The polymerization is conducted according to known methods by operating in the liquid phase, either in the presence or in the absence of an inert hydrocarbon diluent such as hexane, heptane, cyclohexane, or in the gas phase. The polymerization temperature generally ranges from 0° C. to 150° C., preferably from 40° to 90° C., the polymerization being effected at atmospheric pressure or at a pressure higher than atmospheric.

In the case of the preparation of crystalline copolymers of propylene it is preferable to polymerize the propylene until obtaining a homopolymer amount equal to 60-90% of the total polymeric composition; this polymerization step is then followed by one or more polymerization steps of ethylenepropylene mixtures or of ethylene alone, in such manner, that the polymerized ethylene content is comprised between 5 and 30% by weight, based on the composition.

It is possible also to polymerize mixtures of propylene and ethylene in order to obtain copolymers containing less than 5% by weight of ethylene.

The following examples are given to illustrate the present industrial invention, without being a limitation thereof.

EXAMPLE 1

21.8 g of MgCl$_2$.6C$_2$H$_5$OH (58.7 millimoles), prepared by dissolving 1 mole of Mg chloride in 6 moles of ethanol at 70° C. and by crystallizing the complex by cooling to 20° C., were reacted, in an inert gas atmosphere, with a solution containing 2.34 ml (15.6 m/moles) of ethyl benzoate in 200 ml of SiCl$_4$ for 18 hours at 60° C.

The resulting white solid, after filtering, washing with 250 ml of anhydrous n-heptane and drying under vacuum, was treated with 100 ml of TiCl$_4$ at 130° C. for 2 hours, after which TiCl$_4$ was removed by filtration at 130° C. and an equal amount thereof was again added and allowed to react for 2 hours at the same temperature. Thereafter the reaction mass was filtered at 130° C. to remove TiCl$_4$ and washed with n-heptane at 90° C. until chloride ions in the filtrate disappeared. The solid, dried under vacuum, had, on analysis, a titanium content of 1.43% by weight, a magnesium content of 18.70% by weight, a chlorine content of 65.2% by weight and ethyl benzoate content of 8%–9% by weight.

The results of propylene polymerization carried out by using this compound as a catalytic component are reported in Table IV.

EXAMPLES 2, 3 and 4

The elemental analyses of the catalyst components prepared according to the modalities of Example 1, but varying the molar ratio between MgCl$_2$ and ethyl benzoate, are reported in Table I.

The results of polymerizing a catalyst prepared from said components are reported in Table IV.

EXAMPLES 5 and 6

The elemental analyses of the catalyst components prepared according to the modalities of Example 1, but varying the number of ethyl alcohol molecules coordinated with MgCl$_2$ in the starting adduct, are reported in Table II.

The results of polymerizing propylene in contact with catalysts prepared from these components are reported in Table IV.

EXAMPLES 7 and 8

The elemental analyses of the catalyst components prepared according to the modalities of Example 1, but varying the type of alcohol coordinated with MgCl$_2$ in the starting adduct, are reported in Table III.

The results of polymerizing propylene with catalysts prepared from said components are reported in Table IV.

TABLE I

| Ex. | Mg/EB* molar ratio | % by weight of Ti | % by weight of Mg | % by weight of Cl |
|---|---|---|---|---|
| 2 | 6 | 1.80 | 18.50 | 64.50 |
| 3 | 9 | 2.00 | 20.70 | 61.18 |
| 4 | 12 | 2.87 | 20.47 | 64.82 |

EB* = ethyl benzoate

TABLE II

| Ex. | Starting Complex | % by weight of Ti | % by weight of Mg | % by weight of Cl |
|---|---|---|---|---|
| 5 | MgCl$_2$ . 1.6 EtOH* | 1.00 | 23.60 | 63.12 |
| 6 | MgCl$_2$ . 3.2 EtOH* | 1.87 | 18.53 | 64.56 |

EtOH* = ethanol

TABLE III

| Ex. | Starting Complex | % by weight of Ti | % by weight of Mg | % by weight of Cl |
|---|---|---|---|---|
| 7 | MgCl$_2$ . 6CH$_3$OH | 2.08 | 20.32 | 63.50 |

TABLE III-continued

| Ex. | Starting Complex | % by weight of Ti | % by weight of Mg | % by weight of Cl |
|---|---|---|---|---|
| 8 | $MgCl_2 \cdot 4C_4H_9OH$ | 0.96 | 22.17 | 64.97 |

EXAMPLE 9

12.8 g of $MgCl_2.6C_2H_5OH$ (34.5 m/moles), prepared as in Example 1, were reacted in a nitrogen atmosphere with 95 ml of pure $SiCl_4$. The reaction mixture was heated to boiling and allowed to react for 16 hours. Subsequently, 0.86 ml (5.75 m/moles) of ethyl benzoate were added and the whole was allowed to boil for a further 2 hours. The resulting white solid, after having been filtered, repeatedly washed with n-heptane and dried under vacuum, was treated with 150 ml of $TiCl_4$ at 130° C. for 2 hours. $TiCl_4$ was then removed by hot filtration, an equal amount of fresh $TiCl_4$ was added and the treatment was repeated for a further 2 hours. After removal of $TiCl_4$, the mass was washed at 90° C. with n-heptane until chloride ions in the filtrate disappeared.

The solid, dried under vacuum, had the following composition:
titanium=2.39% by weight
magnesium=20.53% by weight
chlorine=62.2% by weight
ethyl benzoate=8%-9% by weight.

The results of polymerizing propylene with catalysts prepared from this component are reported in Table IV.

EXAMPLE 10

21.5 g of anhydrous $MgCl_2$ were dissolved in 200 ml of anhydrous ethanol. After the addition of 5.65 ml of ethyl benzoate, the solution was reacted at 70° C. for 1 hour. By evaporation under vacuum a white crystalline solid separated, which had the formula:

$MgCl_2.35/6C_2H_5OH.1/6$ ethyl benzoate.

11.30 g of the compound described hereinbefore (30.5 m/moles) were reacted, in a nitrogen atmosphere, with 84 ml of pure $SiCl_4$. The mixture was heated to boiling and left at such temperature for 18 hours. The resulting white solid, after being filtered, repeatedly washed with n-heptane and dried under vacuum, was treated with 150 ml of $TiCl_4$ at 130° C. for 2 hours.

Successively $TiCl_4$ was removed by hot filtration, an equal amount of fresh $TiCl_4$ was added and the treatment was repeated for a further 2 hours. After removal of $TiCl_4$, the product was washed at 90° C. with n-heptane until chloride ions in the filtrate disappeared.

The solid, dried under vacuum, had the following composition:
titanium=2.32% by weight
magnesium=20.53% by weight
chlorine=63.12% by weight.

The results obtained by polymerizing propylene in contact with a catalyst prepared from this catalyst component are reported in Table IV.

EXAMPLE 11

5.4 g of $MgCl_2.3.8C_2H_5OH$ (20 m/moles) were reacted in a nitrogen atmosphere with 120 ml of $SiCl_4$. The reaction mass was heated at reflux for 16 hours.

The resulting white solid, after having been filtered, repeatedly washed with n-heptane and dried under vacuum, was treated with a solution containing 0.5 ml (3.3 m/moles) of ethyl benzoate in 150 ml of $TiCl_4$ preheated to 130° C. It was allowed to react at the same temperature for 4 hours. The solid was isolated by filtration, washed with n-heptane and dried under vacuum. On analysis it was found to contain 2.73% of Ti, 21.1% of Mg and 63.9% of chlorine, by weight.

A catalyst prepared from this catalyst-forming component was used to polymerize propylene, with the results shown in Table IV.

EXAMPLE 12

7.3 g of $MgCl_2.6C_2H_5OH$ were treated with $SiCl_4$ in vapor entrained by a nitrogen stream for 6 hours. The total amount of $SiCl_4$ employed corresponded to 400 ml. 2.2 g of the solid product so obtained were suspended in a solution containing, in 30 ml of n-heptane, 0.30 ml of ethyl benzoate, and were allowed to react under stirring for 3 hours at room temperature.

The liquid was removed and the product was dried, after which the isolated white solid was treated with 100 ml of $TiCl_4$ at 130° C. for 2 hours. After removal of $TiCl_4$ by filtration, an equal amount of fresh $TiCl_4$ was added and the treatment was repeated. After having removed the $TiCl_4$, washing was carried out at 90° C. with n-heptane until the filtrate no longer contained chloride ions. The solid, dried under vacuum, had the following composition:
ti=3.96% by weight
mg=18.90% by weight
cl=59.08% by weight.

A catalyst prepred from this component was used to polymerize propylene with the results reported in Table IV.

EXAMPLE 13

15.7 g of $MgCl_2.6C_2H_5OH$, prepared according to Example 1, were introduced batchwise into a glass flask containing a boiling solution having the following composition: 200 ml of n-heptane, 177 ml of $SiCl_4$, 1 ml of ethyl benzoate. The mass was reacted at boiling temperature for 16 hours.

The resulting white solid, after having been filtered, washed three times with 100 ml of n-heptane at 60° C. and dried under vacuum, was treated twice with $TiCl_4$ according to the modalities illustrated in Example 1. The isolated product had the following composition:
titanium=1.39% by weight
magnesium=18.95% by weight
chlorine=64.80% by weight.

A catalyst prepared from this component was used to polymerize propylene with the results reported in Table IV.

EXAMPLE 14

7.3 g of $MgTiCl_4(OC_2H_5)_2.4C_2H_5OH$, prepared according to Belgian patent No. 840,058 (16.5 m/moles), were reacted in an inert gas atmosphere with a mixture of 50 ml of $SiCl_4$ and 0.83 ml (5.5 m/moles) of ethyl benzoate for 92 hours at 60° C.

The resulting solid, after having been filtered, washed with 200 ml of anhydrous n-heptane and dried under vacuum, was treated with 100 ml of $TiCl_4$ at 130° C. for 2 hours, after which, $TiCl_4$ was removed by filtration. An equal amount of $TiCl_4$ was added and the mass was allowed to react at the same temperature for 2 hours. It was then filtered in order to remove $TiCl_4$ and washed at 90° C. with n-heptane until the disappearance of the chloride ions in the filtrate. The solid, dried under vacuum, had, on analysis, a titanium content of 1.30% by weight, a magnesium content of 21.20% by weight and a chlorine content of 62.90% by weight.

Used to polymerize propylene, a catalyst prepared from this component gave the results reported in Table IV.

EXAMPLE 15

6 g of anhydrous $MgCl_2$ (63 m/moles) were suspended in a nitrogen atmosphere in 100 ml of anhydrous n-heptane containing 1.16 ml of $TiCl_4$ and 5 ml of $C_2H_5OH$ were added to the suspension. The mass was reacted under stirring at 20° C. for 3 hours, the solid was separated by decantation and, after being washed with 25 ml of n-heptane and dried under vacuum, it was treated with a solution containing 100 ml of $SiCl_4$ and 1.5 ml (10 m/moles) of ethyl benzoate for 16 hours at 60° C. The resulting solid, after filtering, washing with 250 ml of anhydrous n-heptane and drying under vacuum, was treated with 100 ml of $TiCl_4$ at 130° C. for 2 hours after which $TiCl_4$ was removed by filtration. An equal amount of $TiCl_4$ was added, and the whole was reacted at the same temperature for 2 hours. It was then filtered to remove $TiCl_4$ and washed at 90° C. with n-heptane until the disappearance of the chloride ions from the filtrate. The solid, dried under vacuum, had, on analysis, a titanium content of 1.47% by weight, a magnesium content of 21.87% by weight and a chlorine content of 60.04% by weight.

A catalyst prepared from this component, used in the polymerization of propylene, gave the results shown in Table IV.

EXAMPLE 16

6.4 g of $MgCl_2.6C_2H_5OH$ (24.6 m/moles) were allowed to react, in an inert gas atmosphere, with a solution containing 70 ml of $SnCl_4$ and 0.615 ml (4.1 m/moles) of ethyl benzoate for 20 hours at 70° C.

The resulting white solid, after being filtered, washed with 250 ml of anhydrous n-heptane and dried under vacuum, was treated with 100 ml of $TiCl_4$ at 130° C. for 2 hours. Successively, $TiCl_4$ was removed by hot filtration and an equal amount of $TiCl_4$ was added. The whole was allowed to react at the same temperature for 2 hours, then it was filtered to remove $TiCl_4$ and the product was washed at 90° C. with n-heptane until the disappearance of chloride ions from the filtrate. The solid, dried under vacuum, had, on analysis, a titanium content of 4.1% by weight, a magnesium content of 19.05% by weight and a chlorine content of 58.93% by weight.

The results of using a catalyst prepared from this component in the polymerization of propylene are reported in Table IV.

EXAMPLE 17

5.3 g of $MgCl_2.3.8C_2H_5OH$ (19 m/moles) were reacted, in an inert gas atmosphere, with a mixture consisting of 100 ml of antimony pentachloride and 0.49 ml (3.3 m/moles) of ethyl benzoate for 20 hours at 70° C.

The resulting white solid, after being filtered, washed with 250 ml of anhydrous n-heptane and dried under vacuum, was treated with 100 ml of $TiCl_4$ at 130° C. for 2 hours. After that time period, $TiCl_4$ was removed by filtration and an equal amount thereof was added. The whole was reacted at the same temperature for 2 hours, then filtered to remove $TiCl_4$ and the product was washed at 90° C. with n-heptane until the disappearance of the chloride ions from the filtrate. The solid dried under vacuum, had, on analysis, and by weight a titanium content of 2.30%, a magnesium content of 20.47%, and a chlorine content of 63.10%.

The results of polymerizing propylene in contact with a catalyst prepared from this component are reported in Table IV.

EXAMPLE 18

5.6 g of $MgCl_2.3.8C_2H_5OH$ (21.4 m/moles) were added batch wise, at room temperature and under stirring, to 250 ml of a molar heptane solution of aluminum triisobutyl. After 1 hour, the mass was heated to 80° C. for 4 hours. It was filtered and washed with 200 ml of anhydrous n-heptane. The isolated solid was suspended in a solution of 0.54 ml (3.6 m/moles) of ethyl benzoate in 50 ml of n-heptane, and the resulting suspension was kept under stirring at room temperature for 2 hours.

The product was isolated by filtration and dried under vacuum. The resulting white solid was treated with 100 ml of $TiCl_4$ at 130° C. for 2 hours. After this time-period, $TiCl_4$ was removed by filtration, an equal amount of $TiCl_4$ was added and the whole was caused to react at the same temperature for 2 hours, after which the reaction product was filtered to remove $TiCl_4$, and washed at 90° C. with n-heptane until disappearance of the chloride ions in the filtrate. The solid, dried under vacuum, was found, on analysis, to have, by weight, a titanium content of 2.05%, a magnesium content of 21.25%, a chlorine content of 59.3% and about 7% of ethyl benzoate.

Table IV shows the results of polymerizing propylene in contact with a catalyst prepared from this catalyst component.

EXAMPLE 19

3.1 g of $MgCl_2.6NH_3$ (15.7 m/moles) were added, at room temperature under stirring, to 270 ml of a molar heptane solution of aluminum triisobutyl. After 1 hour, the mixture was heated to 80° C. for 4 hours. It was filtered and the precipitate so obtained was washed with 200 ml of anhydrous n-heptane. The isolated solid was suspended in a solution of 0.39 ml of ethyl benzoate (2.6 m/moles) in 50 ml of n-heptane and the resulting suspension was kept under stirring at room temperature for 2 hours.

The insoluble product was isolated by filtration and dried under vacuum. The resulting white solid was treated with 100 ml of $TiCl_4$ at 130° C. for 2 hours. After this time-period $TiCl_4$ was removed by filtration and an equal amount of $TiCl_4$ was added. The whole was reacted at the same temperature for 2 hours, then filtered to remove $TiCl_4$, and washed at 90° C. with n-heptane until disappearance of the chloride ions in the filtrate. On analysis the solid, dried under vacuum, was found to contain, by weight 2.08% of titanium, 23.05% of magnesium and 61.54% of chlorine.

The propylene polymerization test carried out by using such compound as catalyst component is reported in Table IV.

EXAMPLE 20

2.93 g of $MgCl_2.3.8C_2H_5OH$ (11 m/moles) were caused to react, in a nitrogen atmosphere, with a solution containing 10.5 ml (83 m/moles) of $Al(C_2H_5)_2Cl$ in 60 ml of n-heptane. The whole was reacted for 1 hour, then heated to 80° C. for 3 hours. The precipitate obtained was filtered and washed with 200 ml of n-heptane.

The isolated solid was suspended in a solution of 0.27 ml of ethyl benzoate (1.8 m/moles) in 50 ml of n-heptane, and the resulting suspension was kept under stirring at room temperature for 2 hours. The insoluble product was isolated by filtration and dried under vacuum. The resulting white solid was treated with 100 ml of $TiCl_4$ at 130° C. for 2 hours. After this timeperiod $TiCl_4$ was removed by filtration and an equal amount of $TiCl_4$ was added. The mass was reacted at the same temperature for 2 hours, then it was filtered to remove $TiCl_4$ and washed at 90° C. with n-heptane until disappearance of the chloride ions in the filtrate. The solid, dried under vacuum, exhibited on analysis a titanium content of 1.07% by weight, a magnesium content of 22.9% by weight and a chlorine content of 62.86% by weight.

The propylene polymerization test carried out by using such compound as catalyst component is reported in Table IV.

EXAMPLE 21

4.5 g of $MgCl_2.2.5H_2O.2.3C_2H_5OH$ (18.3 m/moles) were added batch wise, at room temperature under stirring, to 200 ml of a molar heptane solution of $Al(iso-C_4H_9)_3$. After 1 hour, the mass was heated to 80° C. for 4 hours. It was filtered and washed with 200 ml of anhydrous n-heptane. The isolated solid was suspended in a solution of 0.46 ml (3.05 m/moles) of ethyl benzoate in 50 ml of n-heptane and the resulting suspension was kept under stirring at room temperature for 2 hours. The product was isolated by filtration and dried under vacuum. The resulting white solid was treated with 100 ml of $TiCl_4$ at 130° C. for 2 hours. After this time-period $TiCl_4$ was removed by filtration and an equal amount of $TiCl_4$ was added. The whole was reacted at the same temperature for 2 hours, then it was filtered to remove $TiCl_4$ and washed at 90° C. with n-heptane until disappearance of the chloride ions in the filtrate.

On analysis the solid, dried under vacuum, had, by weight, a titanium content of 2.06%, a magnesium content of 16.39% and a chlorine content of 60.4%.

The results of the propylene polymerization test conducted using this compound as catalyst component are reported in Table IV.

EXAMPLE 22

The complex $MgCl_2.C_2H_5OH$ was prepared by co-grinding (at 30° C. for 40 hours in a steel cylindrical vibrating mill, having a height of 80 mm and a diameter of 125 mm, charged with 150 steel balls of 10 mm diameter) 92 g of anhydrous $MgCl_2$ (0.97 mole) and 56.5 ml of anhydrous ethyl alcohol (0.97 mole). 8.5 g of the complex so obtained were treated, at 60° C., for 40 hours, with a solution containing 1.5 ml of ethyl benzoate in 50 ml of $SiCl_4$.

The filtered product, after washing with n-heptane and drying under vacuum, was treated with 150 ml of $TiCl_4$ at 130° C. for 2 hours under stirring. After removal of $TiCl_4$ by filtration, the treatment was repeated with the same amount of $TiCl_4$. The product, after filtration, washing at 90° C. with n-heptane until disappearance of the chloride ions from the filtrate, and drying under vacuum, exhibited the following composition:
Ti = 1.12% by weight
Mg = 20.82% by weight
Cl = 63.3% by weight.

The polymerization test carried out by using this compound as catalyst component is reported in Table IV.

EXAMPLE 23

19.6 g of $MgCl_2.(C_4H_8)_2O$ (82 m/moles) were added batch wise, at room temperature and under stirring, to 328 ml of a molar heptane solution of aluminum triisobutyl. After 1 hour, the whole was heated to 80° C. and kept at such temperature for 6 hours. It was filtered and washed with 300 ml of a heptane solution containing 0.1 mole of ethyl benzoate, and the suspension was kept under stirring at room temperature for 2 hours.

The product was isolated by filtration and dried under vacuum. The resulting white solid was treated with 200 ml of $TiCl_4$ at 130° C. for 2 hours. After this time-period, $TiCl_4$ was removed by filtration and an equal amount of $TiCl_4$ was added. The mass was allowed to react at the same temperature for 2 hours, whereupon it was filtered to remove $TiCl_4$ and washed at 90° C. with n-heptane until disappearance of the chlorine ions in the filtrate.

The solid, dried under vacuum, exhibited on analysis a titanium content of 1.54% by weight, a magnesium content of 21.35% by weight and a chlorine content of 67.9% by weight.

The propylene polymerization test carried out by using this solid compound as catalytic component is reported in Table IV.

EXAMPLE 24

17.7 g of $MgCl_2.CH_3COOC_2H_5$ (97 m/moles) were added, in small batches, at room temperature and under stirring, to 290 ml of a molar heptane solution of aluminum triisobutyl. After 1 hour, the mixture was heated to 80° C. and kept at such temperature for 6 hours. It was filtered and then washed with 300 ml of anhydrous n-heptane. The isolated solid was suspended in 162 ml of a heptane solution containing 0.1 mole of ethyl benzoate, and kept under stirring at room temperature for 2 hours.

The product was isolated by filtration and dried under vacuum. The resulting white solid was treated with 200 ml of $TiCl_4$ at 130° C. for 2 hours. After this time, $TiCl_4$ was removed by filtration and an equal amount thereof was added. The whole was allowed to react at the same temperature for 2 hours, whereupon it was filtered to remove $TiCl_4$ and washed at 90° C. with n-heptane until disappearance of chlorine ions in the filtrate. The solid, dried under vacuum, exhibited on analysis a titanium content of 1.45% by weight, a magnesium content of 20.05% by weight and a chlorine content of 65.7% by weight.

The propylene polymerization test conducted by using this solid compound as catalyst component is reported in Table IV.

EXAMPLE 25

15.3 g of $MgCl_2.CH_3COCH_3$ (100 m/moles) were added, in small batches, to 250 ml of a molar heptane solution of aluminum triethyl, at room temperature and under stirring. After 1 hour, the mass was heated to 80° C. and kept at such temperature for 6 hours. It was filtered and washed with 300 ml of anhydrous n-heptane. The isolated solid was suspended in 170 ml of a heptane solution of 0.1 mole of ethyl benzoate, and kept under stirring at room temperature for 2 hours.

The product was isolated by filtration and dried under vacuum. The resulting white solid was treated with 200 ml of TiCl$_4$ at 130° C. for 2 hours. After this time, TiCl$_4$ was removed by filtration and an equal amount thereof was added. The whole was allowed to react at the same temperature for 2 hours, then it was filtered to remove TiCl$_4$ and washed at 90° C. with n-heptane until disappearance of chlorine ions in the filtrate.

The solid, dried under vacuum, exhibited on analysis, by weight, a titanium content of 2.22%, a magnesium content of 18.98% and a chlorine content of 62.47%.

The results of polymerizing propylene with a catalyst prepared from this solid catalyst-forming component are shown in Table IV.

EXAMPLE 26

13.6 g of MgCl$_2$.CH$_3$CN (100 m/moles) were added, in small batches, to 250 ml of a molar heptane solution of aluminum triisobutyl, at room temperature and under stirring. After 1 hour, the mixture was heated to 80° C. and kept at such temperature for 2 hours. It was filtered and washed with 300 ml of anhydrous n-heptane. The isolated solid was suspended in 170 ml of a heptane solution of 0.1 mole of ethyl benzoate and kept under stirring at room temperature for 2 hours.

The product was isolated by filtration and dried under vacuum. The resulting white solid was treated with 200 ml of TiCl$_4$ at 130° C. for 2 hours. After this time, TiCl$_4$ was removed by filtration and an equal amount thereof was added. The whole was allowed to react at the same temperature for 2 hours, whereupon it was filtered to remove TiCl$_4$ and washed at 90° C. with n-heptane until disappearance of chlorine ions in the filtrate.

The solid, dried under vacuum, exhibited on analysis, by weight, a titanium content of 2.17%, a magnesium content of 18.58% and a chlorine content of 61.75%.

The propylene polymerization test carried out using this solid compound as catalyst component is reported in Table IV.

EXAMPLE 27

10.6 g of MgCl$_2$.2C$_5$H$_5$N (42 m/moles) were added, in small batches, to 200 ml of a molar heptane solution of aluminum triisobutyl, at room temperature and under stirring. After 1 hour, the mixture was heated to 80° C. and kept at such temperature for 2 hours. The reaction mass was filtered and washed with 300 ml of anhydrous n-heptane. The isolated solid was suspended in 70 ml of a heptane solution of 0.1 mole of ethyl benzoate and kept under stirring at room temperature for 2 hours.

The product was isolated by filtration and dried under vacuum. The resulting white solid was treated with 200 ml of TiCl$_4$ at 130° C. for 2 hours. After this time, TiCl$_4$ was removed by filtration and an equal amount thereof was added. The whole was allowed to react at the same temperature for 2 hours, whereupon it was filtered to remove TiCl$_4$ and washed at 90° C. with n-heptane until chlorine ions disappeared from the filtrate.

The solid, dried under vacuum, exhibited on analysis, by weight, a titanium content of 1.21%, a magnesium content of 21.27% and a chlorine content of 68.03%.

The propylene polymerization test carried out by using said solid compound as catalyst component is reported in Table IV.

EXAMPLE 28

49 m/moles of MgBr$_2$.(C$_2$H$_5$)$_2$O were added in small batches, to 110 ml of a molar heptane solution of aluminum triisobutyl, at room temperature and under stirring. After 1 hour, the mixture was heated to 80° C. and kept at such temperature for 2 hours. It was filtered and washed with 300 ml of anhydrous n-heptane. The isolated solid was suspended in 80 ml of a heptane solution of 0.1 mole of ethyl benzoate and kept under stirring at room temperature for 2 hours.

The product was isolated by filtration and dried under vacuum. The resulting white solid was treated with 200 ml of TiCl$_4$ at 130° C. for 2 hours. After this time, TiCl$_4$ was removed by filtration and an equal amount thereof was added. The whole was allowed to react at the same temperature for 2 hours, whereupon it was filtered to remove TiCl$_4$ and washed at 90° C. with n-heptane until chlorine disappeared from the filtrate.

The solid, dried under vacuum, exhibited on analysis, by weight, a titanium content of 0.72%, a magnesium content of 15.93%.

The propylene polymerization test carried out using said solid compound as catalyst component is reported in Table IV.

EXAMPLE 29

44 m/moles of MgCl$_2$.2 α-butyro-lactone were added, in small batches, to 250 ml of a molar heptane solution of aluminum triisobutyl, at room temperature and under stirring. After 1 hour, the mixture was heated to 80° C. and kept at such temperature for 2 hours. It was filtered and washed with 300 ml of anhydrous n-heptane. The isolated solid was suspended in 73 ml of a heptane solution of 0.1 mole of ethyl benzoate and kept under stirring at room temperature for 2 hours.

The product was isolated by filtration and dried under vacuum. The resulting white solid was treated with 200 ml of TiCl$_4$ at 130° C. for 2 hours, after which TiCl$_4$ was removed by filtration and an equal amount thereof was added. The whole was allowed to react at the same temperature for 2 hours, whereupon it was filtered to remove TiCl$_4$ and washed at 90° C. with n-heptane until disappearance of chlorine ions in the filtrate.

On analysis, the solid, dried under vacuum, eas found to have a titanium content of 1.62% by weight, a magnesium content of 19.02% by weight and a chlorine content of 61.12% by weight.

The results of the polymerization of propylene in contact with a catalyst prepared from said solid compound as one catalyst-forming component, are shown in Table IV.

EXAMPLE 30

8.3 g (30.4 m/moles) of MgCl$_2$.2CH$_3$CON(CH$_3$)$_2$ were added, in small batches, to 150 ml of a molar heptane solution of aluminum triisobutyl, at room temperature and under stirring. After 1 hour, the mixture was heated to 80° C. and kept at such temperature for 2 hours. It was filtered and washed with 300 ml of anhydrous n-heptane. The isolated solid was suspended in 51 ml of a heptane solution of 0.1 mole of ethyl benzoate and kept under stirring at room temperature for 2 hours.

The product was isolated by filtration and dried under vacuum. The resulting white solid was treated with 200 ml of TiCl$_4$ at 130° C. for 2 hours, after which TiCl$_4$ was removed by filtration and an equal amount thereof was added. The whole was allowed to react at the same temperature for 2 hours, whereupon it was filtered to remove TiCl$_4$ and washed at 90° C. with n-heptane until disappearance of chlorine ions in the filtrate. The solid, dried under vacuum, was found on analysis, to contain by weight, 3.95% titanium, 13.29% of magnesium and 57.16% of chlorine.

The propylene polymerization test carried out by using said solid compound as a catalyst component is reported in Table IV.

EXAMPLE 31

41.4 g of MgCl$_2$.3C$_2$H$_5$OH were obtained in microspheroidal form (diameter of particles less than 42 micron) through a process of spray-cooling from smelted MgCl$_2$.6C$_2$H$_5$OH (by apparatus Niro Atomizer) and subsequent removal of alcohol under vacuum at 50° C.

This adduct was treated with aluminum triisobutyl and subsequently with TiCl$_4$ as described in Example 18. The solid catalytic component obtained in this way exhibited, on analysis, and by weight, a titanium content of 1.98%, a magnesium content of 18.60%, and a chlorine content of 62%.

The propylene polymerization test was carried out under the conditions A, using 39 mg of the catalytic component of this example. The polypropylene obtained had an inherent viscosity of 2.03 dl/g, left a residue of 92% on extraction with n-heptane, and had the following particle-size distribution:

710-500 microns = 21.1%
500-250 microns = 60.3%
250-125 microns = 16.2%.

COMPARATIVE EXAMPLE 15.7 g of MgCl$_2$35/6C$_2$H$_5$OH.1/6 of ethyl benzoate, prepared as described in Example 10, were evaporated under vacuum at 50° C. for 3 hours.

The product so obtained was treated with 150 ml of TiCl$_4$ at 130° C. for 2 hours. TiCl$_4$ was then removed by hot filtration, and an equal amount of fresh TiCl$_4$ was added, repeating the treatment for a further 2 hours.

Once TiCl$_4$ had been removed, the product was washed at 90° C. with n-heptane until disappearance of the chlorine ions in the filtrate. The solid, dried under vacuum, exhibited on analysis a titanium content equal to 8.2% by weight and an ethylbenzoate content of 3.8% by weight.

The propylene polymerization test carried out by using said compound as catalyst forming component is reported in Table IV.

PROPYLENE POLYMERIZATION IN A SOLVENT

Conditions A 5 millimoles of an aluminum trialkyls mixture, having the following composition of the gases (% by volume) after hydrolysis:

ethane = 9.
isobutane = 49.4
n-butane = 41.2
propane = 0.16
isobutene = 0.24 were reacted at room temperature with 1.25 millimoles of methyl para-toluate in 80 ml of n-heptane (anhydrous and desulphurized) for 5 minutes.

50 ml of the solution were contacted with an appropriate amount of catalyst forming component prepared according to the foregoing examples, as reported in table IV, column 2.

The remaining 30 ml of the solution were diluted to 1000 ml with n-heptane and introduced, under nitrogen pressure, into a steel autoclave having a capacity of 3000 ml, equipped with anchor magnetic stirrer and thermometer, thermoregulated at 40° C., into which propylene was made to flow.

In the same way, the catalystic component suspension was introduced into the autoclave. After closing the autoclave, hydrogen was added up to a partial pressure of 0.1 atm., then the whole was heated to 60° C. under simultaneous feeding of propylene up to a total pressure of 5 atmospheres. Such pressure was kept constant throughout the polymerization by continuous feeding of the monomer.

After 4 hours, the polymerization was stopped and polypropylene was isolated by treatment of the total reaction product with methanol and acetone. The results of the polymerization tests conducted under these conditions and using catalyst components as described in the examples are reported in Table IV.

Conditions B 1.25 millimoles of the aluminum trialkyls mixture described under Conditions A were reacted for 5 minutes at room temperature with 0.37 millimoles of methyl para-toluate in 80 ml of (anhydrous desulphurized) n-hexane.

50 ml of the solution were contacted with a suitable amount of the catalyst component prepared according to the foregoing examples, as reported in table IV, column 2.

The remaining 30 ml were diluted to 500 ml with n-hexane and introduced, under nitrogen pressure, into a steel autoclave having a capacity of 1000 ml, equipped with anchor magnetic stirrer and thermometer, thermoregulated at 40° C., into which propylene was made to flow.

Successively, the catalyst component suspension was introduced into the autoclave and the polymerization proceeded under the same modalities as described under Conditions A.

Conditions C 1.25 millimoles of aluminum triisobutyl were reacted for 5 minutes at room temperature with 0.25 millimoles of methyl para-toluate in 80 ml of (anhydrous desulphurized) n-hexane. 50 ml of such solution were contacted with a catalyst component according to the foregoing examples in amount given in Tab. IV col. 2.

The remaining 30 ml were diluted to 500 ml with n-hexane and introduced, under nitrogen pressure, into a steel, 1-liter autoclave, equipped with anchor magnetic stirrer and thermometer, thermoregulated at 40° C., into which propylene was made to flow. Subsequently, the catalyst component suspension was introduced into the autoclave and the polymerization proceeded under the modalities described under Conditions A.

Conditions D 2.15 millimoles of aluminum triethyl were reacted for 5 minutes at room temperature with 0.64 millimoles of methyl para-toluate in 80 ml of (anhydrous desulphurized) n-hexane.

50 ml of said solution were contacted with the given amount of the catalyst component prepared according to the examples described herein. The remaining 30 ml were diluted to 500 ml with n-hexane and introduced, under nitrogen pressure, into a steel autoclave, having a 1-liter capacity, equipped with anchor magnetic stirrer and thermometer, thermoregulated at 40° C., into which propylene was caused to flow.

The catalyst component suspension was then introduced into the autoclave and the polymerization or propylene proceeded under Conditions A.

Conditions E 2.15 millimoles of aluminum triethyl were reacted for 5 minutes at room temperature with 0.64 millimoles of ethyl para-anisate in 80 ml of (anhydrous desulphurized) n-hexane.

50 ml of the solution were contacted with a suitable amount of catalyst component prepared according to the examples herein, (see table IV, column 2).

The remaining 30 ml were diluted to 500 ml with n-hexane and introduced, under a nitrogen pressure, into a steel autoclave equipped with anchor magnetic stirrer and thermometer, thermoregulated at 40° C., into which propylene was caused to flow.

The catalyst component suspension was then introduced into the autoclave and the propylene polymerization proceeded under the modalities of Conditions A.

Conditions F 1.25 millimoles of the aluminum trialkyls mixture described under Conditions A were reacted for 5 minutes at room temperature with 0.37 millimoles of methyl para-toluate in 80 ml of (anhydrous desulphurized) n-hexane.

50 ml of the solution were contacted with a suitable amount of catalyst component prepared according to the foregoing examples, (see Table IV, column 2).

The remaining 30 ml were diluted to 500 ml with n-hexane and were introduced, under nitrogen pressure, into a steel autoclave having a capacity of 1000 ml, equipped with anchor magnetic stirrer and thermometer, thermoregulated at 40° C., and into which propylene was caused to flow.

In the same way, the catalyst component suspension was then introduced into the autoclave. After the autoclave was closed, hydrogen was added up to a partial pressure of 0.2 atm., the contents of the autoclave were heated to 60° C. with simultaneous feeding of propylene up to a total pressure of 9 atmospheres, which was kept constant throughout the polymerization by feeding of the monomer.

After 4 hours, polymerization was stopped and polypropylene was isolated by treatment of the crude polymerization product with methanol and acetone. The results of the polymerization tests conducted under the aforesaid conditions and using the catalyst components described in examples herein are reported in Table IV.

Conditions G 1.25 millimoles of aluminum triisobutyl were reacted for 5 minutes at room temperature with 0.25 millimoles of methyl para-toluate in 80 ml of (anhydrous desulphurized) n-hexane.

50 ml of the solution were contacted with a suitable amount of catalyst component prepared according to the foregoing examples, (see Table IV, column 2).

The remaining 30 ml were diluted to 500 ml with n-hexane and introduced, under nitrogen pressure, into a steel 1000-ml autoclave, equipped with anchor magnetic stirrer and thermometer, thermoregulated at 40° C., into which propylene was caused to flow.

In the same way, the catalyst component suspension was introduced into the autoclave. After the autoclave was closed, hydrogen was added up to a partial pressure of 0.1 atm., then the whole was heated to 50° C. with simultaneous feeding of propylene up to a total pressure of 5 atmospheres, which pressure was kept constant throughout the polymerization by feeding the monomer.

After 4 hours, the polymerization was stopped and polypropylene was isolated by treating the crude (total) polymerization product with methanol and acetone. The results of the polymerization tests conducted under the aforesaid conditions and utilizing the catalyst components of the foregoing examples, as one catalyst-forming component, are reported in Table IV.

Conditions H 1.25 millimoles of aluminum triisobutyl were treated for 5 minutes at room temperature with 0.25 millimoles of methyl para-toluate in 80 ml of (anhydrous desulphurized) n-hexane.

50 ml of the solution were contacted with an appropriate amount of catalyst component prepared according to the foregoing examples, (see Table IV, column 2).

The remaining 30 ml were diluted to 500 ml with n-hexane and introduced, under nitrogen pressure, into a steel autoclave having a 1000 ml capacity, equipped with anchor magnetic stirrer and thermometer, thermoregulated at 40° C., and into which propylene was caused to flow.

In the same way, the catalyst component suspension was introduced into the autoclave. After the autoclave was closed, hydrogen was added up to a partial pressure of 0.1 atm., then the mass was heated to 70° C. under simultaneous feeding of propylene up to a total pressure of 5 atmospheres, which pressure was kept constant throughout the polymerization by feeding of the monomer.

After 4 hours, the polymerization was stopped and polypropylene was isolated by treatment of the total (crude) polymerization product with methanol and acetone. The results of the polymerization tests conducted under said conditions and utilizing catalyst components as described in the present examples are reported in Table IV.

PROPYLENE POLYMERIZATION IN LIQUID MONOMER

In tab. IV (2) given amount of the catalyst component prepared according to any of the foregoing examples was suspended in a solution containing, in 50 ml of n-heptane, 5 m/moles of aluminum trialkyl and 1.75 m/moles of methyl para-toluate.

The suspension thus obtained was introduced, under argon pressure, into a steel autoclave having a 3,000 ml capacity, equipped with anchor magnetic stirrer and thermometer, thermoregulated at 60° C. and containing 600 g of propylene and hydrogen for a partial pressure of 0.2 atmospheres.

After 4 hours, the reaction was stopped by removal of unpolymerized monomer, after which the polypropylene was isolated.

The results of the polymerization tests conducted under aforesaid conditions and using the catalyst components described in the examples are reported in Table IV.

PROPYLENE POLYMERIZATION IN THE GAS PHASE 50 g of thoroughly dry polyethylene in powder, along with a suspension containing, in 50 ml of n-pentane, an amount (given in Table IV(2)) of catalyst component prepared according to the foregoing examples, besides 5 millimoles of aluminum triisobutyl and 1.25 millimoles of methyl para-toluate were introduced into a stainless steel autoclave having a 2000 ml capacity, equipped with helical screw stirrer and thermoregulated at 60° C. After discharge of the n-pentane under vacuum, 0.2 atmospheres of hydrogen and propylene up to a total pressure of 15 atmospheres were added. The pressure was kept constant throughout the polymerization by continuously feeding the monomer. After 4 hours, the polymerization was stopped and the polypropylene produced was isolated.

The results of the polymerization tests conducted under aforesaid conditions and utilizing catalyst components of the present examples are reported in Table IV.

TABLE IV

| CATALYST COMPONENT | | POLYMERIZATION | POLYMER | | | |
|---|---|---|---|---|---|---|
| Example | mg | % of Ti | CONDITIONS | Product g | ηi(dl/g) | Heptane residue* (%) | Yield g of polymer/ g of Ti |
| 1 | 34 | 1.43 | C | 175 | 1.78 | 90.0 | 372,000 |
| 1 | 45 | 1.43 | B | 185 | 2.03 | 93.0 | 290,000 |
| 1 | 78 | 1.43 | Gas Phase | 195 | 2.34 | 88.0 | 175,000 |
| 2 | 32 | 1.87 | C | 123 | 1.79 | 90.3 | 200,000 |
| 3 | 29 | 2.00 | C | 180 | 2.21 | 90.0 | 310,000 |
| 4 | 41 | 2.87 | C | 160 | 1.77 | 88.2 | 136,000 |
| 5 | 100 | 1.00 | C | 175 | 1.65 | 88.3 | 175,000 |
| 6 | 39 | 1.80 | C | 141 | 1.80 | 91.0 | 200,000 |
| 7 | 40 | 2.08 | C | 130 | 1.75 | 84.5 | 156,000 |
| 8 | 82 | 0.96 | C | 100 | 1.89 | 84.7 | 127,000 |
| 9 | 38 | 2.39 | C | 205 | 2.27 | 92.0 | 225,000 |
| 9 | 45 | 2.39 | G | 110 | 2.13 | 89.0 | 102,000 |
| 9 | 43 | 2.39 | H | 125 | 2.28 | 91.3 | 123,000 |
| 9 | 23 | 2.39 | F | 195 | 1.85 | 90.3 | 360,000 |
| 9 | 43 | 2.39 | D | 130 | 1.88 | 94.1 | 126,000 |
| 9 | 35 | 2.39 | E | 124 | 1.90 | 92.5 | 147,000 |
| 9 | 25 | 2.39 | Liquid Monomer | 290 | 4.0 | 97.6 | 485,000 |
| 10 | 32 | 2.32 | C | 173 | 2.06 | 90.1 | 234,000 |
| 11 | 86 | 2.73 | A | 200 | 2.31 | 93.5 | 85,000 |
| 12 | 96 | 3.96 | A | 510 | 2.09 | 87.5 | 134,000 |
| 13 | 43 | 1.39 | C | 70 | 2.28 | 90.7 | 117,000 |
| 14 | 94 | 1.30 | A | 165 | 1.80 | 89.4 | 135,000 |
| 15 | 43 | 2.05 | C | 110 | 1.47 | 84.6 | 125,000 |
| 16 | 95 | 4.10 | A | 680 | 2.51 | 89.5 | 173,000 |
| 17 | 72 | 2.30 | A | 135 | 2.12 | 88.3 | 82,000 |
| 18 | 95 | 2.05 | A | 730 | 2.86 | 93.7 | 375,000 |
| 19 | 94 | 2.08 | A | 550 | 2.45 | 90.4 | 282,000 |
| 20 | 47 | 1.07 | C | 48 | 2.20 | 89.0 | 96,000 |
| 21 | 84 | 2.06 | A | 150 | 2.28 | 92.5 | 87,000 |
| 22 | 93 | 1.12 | A | 85 | 2.06 | 92.0 | 84,000 |
| 23 | 42 | 1.54 | A | 160 | 1.78 | 88.4 | 246,000 |
| 24 | 55 | 1.45 | A | 175 | 1.92 | 89.0 | 220,000 |
| 25 | 102 | 2.22 | A | 320 | 1.64 | 86.2 | 145,000 |
| 26 | 70 | 2.17 | A | 80 | 1.50 | 88.0 | 53,000 |
| 27 | 58 | 1.21 | A | 140 | 1.73 | 87.0 | 200,000 |
| 28 | 108 | 0.72 | A | 150 | 1.52 | 83.2 | 193,000 |
| 29 | 69 | 1.62 | A | 135 | 1.55 | 86.2 | 120,000 |
| 30 | 95 | 3.95 | A | 155 | 1.68 | 91.5 | 41,000 |
| 31 | 39 | 1.98 | A | 250 | 2.03 | 92.0 | 320,000 |
| Comparative example | 34 | 8.2 | C | 130 | 1.61 | 69.2 | 46,500 |

*Residue of the extraction with boiling n-heptane for 3 hours

What we claim is:

1. A solid catalyst component for preparing catalysts for polymerizing alpha-olefins containing at least three carbon atoms, which comprises Mg dihalide and, combined with the dihalide, a Ti compound and a hydrocarbyl electron-donor free of active hydrogen atoms, the molar ratio Mg/Ti in said catalyst component being from 5 to 100 and the g moles of the electron-donor compound being from 0.4 to 3.5 per 1 g atom of Ti, and the content of Ti compounds soluble in $TiCl_4$ at 80° C. present in the catalyst component being less than 50% by weight with respect to the total content of Ti compounds, said catalyst component being obtained by reacting:

(a) a halogenated Ti compound soluble in hydrocarbons and containing at least a Ti-halogen bond;

(b) a product comprising a Mg dihalide, obtained by decomposition of an adduct between a Mg dihalide and at least 0.5 moles per mole of Mg dihalide of an electron-donor compound selected from the group consisting of hydrocarbyl electron-donors, ammonia, $POCl_3$ and $PSCl_3$, the decomposition of the adduct being carried out with a substance capable of reacting with the electron-donor compound of the adduct and selected from the group consisting of organometallic compounds of metals of Groups I to III of the Mendelyeev Periodic Table or of Si, and, when the electron-donor of the adduct contains active hydrogen atoms, also from the group consisting of halides of tetravalent Si, trihalides of Al and B and halides of Sn and Sb, said decomposition product being characterized in that, in its X-rays powder spectrum instead of the maximum intensity line appearing in the normal Mg dihalide spectrum, a halo appears the intensity maximum of which is shifted with respect to said line; and (c) a hydrocarbyl electron-donor free of active hydrogen atoms, which may be also reacted with (a) or combined with (b) before reacting (a) with (b).

2. A catalyst component according to claim 1 prepared by using substances reactive with the electron-donor of the Mg dihalide adduct selected from the group consisting of SiCl$_4$, SnCl$_4$ and the Al-triisoalkyls.

3. A catalyst component according to claim 1 in which the adducts of the Mg dihalides contain tetravalent Ti halide.

4. Catalyst components according to claim 1, further characterized in that the content of Ti compounds soluble in TiCl$_4$ at 80° C. is less than 20% by weight with respect to the total content of Ti compounds.

5. Catalyst components according to claim 1, in which the organic electron-donor compounds of the Mg adduct are selected from the group consisting of aliphatic and aromatic alcohols and thioalcohols, phenols, primary and secondary amines, amides, and aliphatic and aromatic carboxylic acids.

6. Catalyst components according to claim 1, in which the adducts of the Mg dihalides are adducts of MgCl$_2$ or of MgBr$_2$.

7. Catalyst components according to claim 1, in which the decomposition product of the adducts of the Mg dihalides reveals, on X-ray analysis, a spectrum in which the maximum intensity line appearing at 2.56 Å in the case of rhombohedral Mg chloride and at 2.75 Å in the case of hexagonal Mg chloride is not present, and in its place there appears a halo the maximum intensity of which is comprised between 2.44 and 2.97 Å.

8. Catalyst components according to claim 1, in which the electron-donor compound not containing active hydrogen is selected from the group consisting of esters of aromatic acids and aliphatic and aromatic ethers.

9. Catalyst components according to claim 8, in which the electron-donor compound is benzoic acid ester.

10. Catalyst components according to claim 8, in which the amount of Ti compound insoluble in TiCl$_4$ at 80° C. is lower than 4% by weight expressed as Ti metal.

11. Catalyst components according to claim 1, in which the Ti compound reacted with the decomposition product of the adducts of the Mg dihalides is TiCl$_4$.

12. Catalysts for polymerizing alpha-olefins containing at least three carbon atoms, comprising the product obtained by mixing the following components:
(A) an organometallic Al compound free of halogen atoms directly bound to Al and selected from the group consisting of Al-alkyl compounds, Al-alkyl-alkoxyl compounds and Al-alkyl hydrides;
(B) a hydrocarbyl electron-donor in such amount that from 10% to 95% of the compound (a) is combined with the electron-donor compound; and
(C) a catalyst component obtained by reacting:
 (a) a halogenated Ti compound soluble in hydrocarbons and containing at least a Ti-halogen bond;
 (b) a product comprising a Mg dihalide obtained by decomposition of an adduct between a Mg dihalide and at least 0.5 moles per mole of Mg dihalide of an electron-donor compound selected from the group consisting of hydrocarbyl electron-donors, ammonia, POCl$_3$ and PSCl$_3$, the decomposition of the product being carried out with a substance capable of reacting with the electron-donor compound of the adduct and selected from the group consisting of organometallic compounds of metals of Groups I to III of the Mendelyeev Periodic Table, or of Si, and, when the electron-donor of the adduct contains active hydrogen atoms, also from the group consisting of halides of tetravalent Si, trihalides of Al and B and halides of Sn and Sb, said decomposition product being characterized in that, in its X-rays powder spectrum, instead of the maximum intensity line appearing in the normal Mg dihalide spectrum, a halo appears the intensity maximum of which is shifted with respect to said line; and
 (c) a hydrocarbyl electron-donor free of active hydrogen atoms, which may be also reacted with (a) or combined with (b) before reacting (a) with (b).

13. Process for preparing a catalyst component which comprises Mg dihalide and, combined with the dihalide, a halogenated Ti compound soluble in hydrocarbons and containing at least a Ti-halogen bond and a hydrocarbyl electron-donor free of active hydrogen atoms, the molar ratio Mg/Ti in said catalyst component being from 5 to 100 and the g moles of the electron-donor compound being from 0.4 to 3.5 per 1 g atom of Ti, and the content of Ti compounds soluble in TiCl$_4$ at 80° C. present in the catalyst component being less than 50% by weight with respect to the total content of Ti compounds, which process consists in reacting:
(a) the adduct between a Mg dihalide and at least 0.5 moles per mole of Mg dihalide of an electron-donor compound selected from the group of hydrocarbyl electron-donors compounds, ammonia, POCl$_3$ and PSCl$_3$, with
(b) a substance reactive with the electron-donor compound of the adduct and selected from the group consisting of organometallic compounds of metals of groups I to III of the Mendelyeev Periodic Table or of Si, and, when the electron-donor of the adduct contains active hydrogen atoms, also from the group consisting of halides of tetravalent Si, trihalides of Al and B and halides of Sn and Sb, in suspension in a liquid phase which does not dissolve the Mg dihalide, separating the solid reaction product from the reaction liquid phase and reacting it with the halogenated Ti compound in liquid phase, the reaction with the Ti compound being conducted in the presence of the electron-donor compound free of active hydrogen, and then separating the solid reaction product from the reaction liquid phase under conditions such that the content of Ti compounds soluble in TiCl$_4$ at 80° C. that remain in the solid product is lower than 50% by weight with respect to the total content of the Ti compounds present in the solid product.

14. The process according to claim 13, in which an adduct of MgCl$_2$ with an aliphatic alcohol is reacted in suspension in the liquid phase with SiCl$_4$ or SnCl$_4$, the solid product is separated from the reaction liquid phase and reacted with TiCl$_4$ in excess at a temperature ranging from 100° to 135° C., and the excess TiCl$_4$ is removed at a temperature higher than 80° C.

* * * * *

UNITED STATES PATENT OFFICE
CERTIFICATE OF CORRECTION

Patent No. 4,149,990  Dated April 17, 1979

Inventor(s) Umberto GIANNINI et al

It is certified that error appears in the above-identified patent and that said Letters Patent are hereby corrected as shown below:

[54] In the title, the word "Alpha" should appear before the word - - - -Olefins - - -.

Signed and Sealed this

*Thirty-first* Day of *July 1979*

[SEAL]

*Attest:*

*Attesting Officer*

LUTRELLE F. PARKER
Acting Commissioner of Patents and Trademarks